A. MARCH.
Knitting-Machine.
No. 223,292. Patented Jan. 6, 1880.
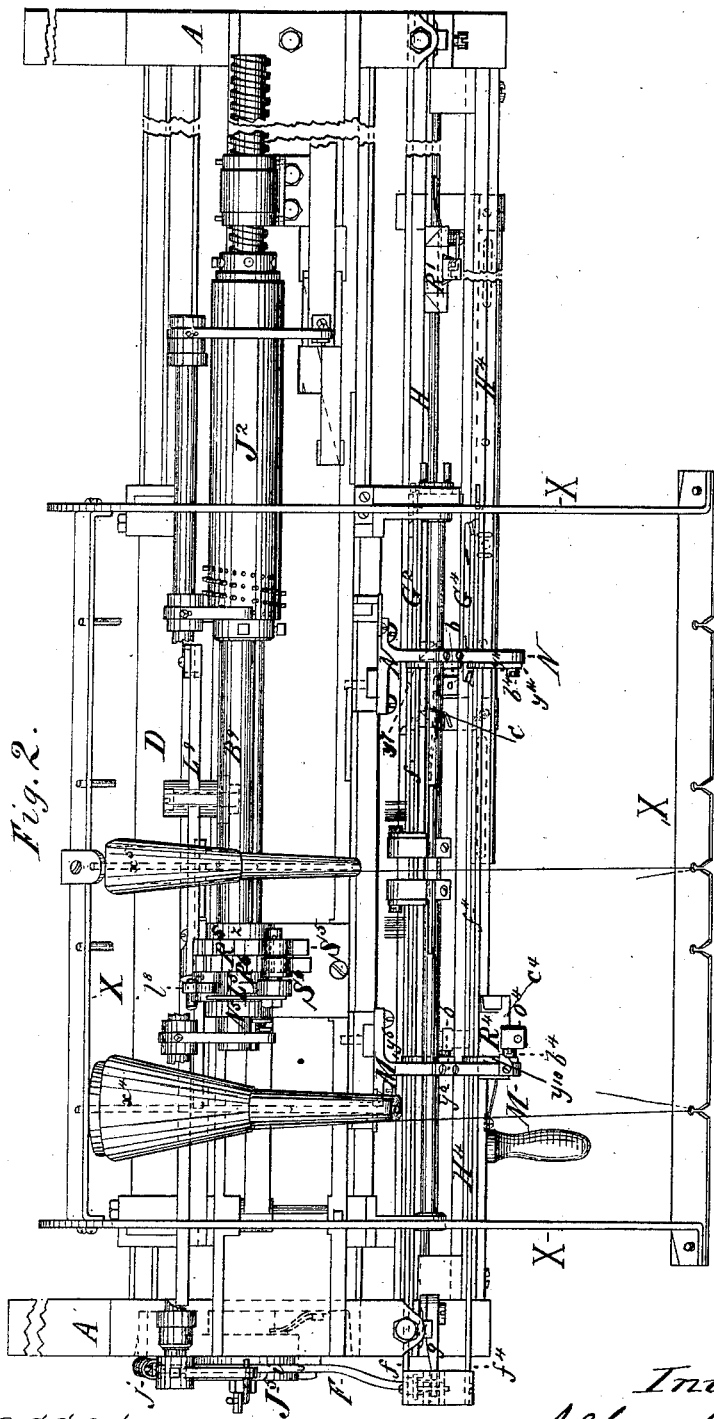
Witnesses
W. L. Bennerd.
Thomas H. Mott
Inventor.
Alfred March
by his atty.
E. S. Renwick

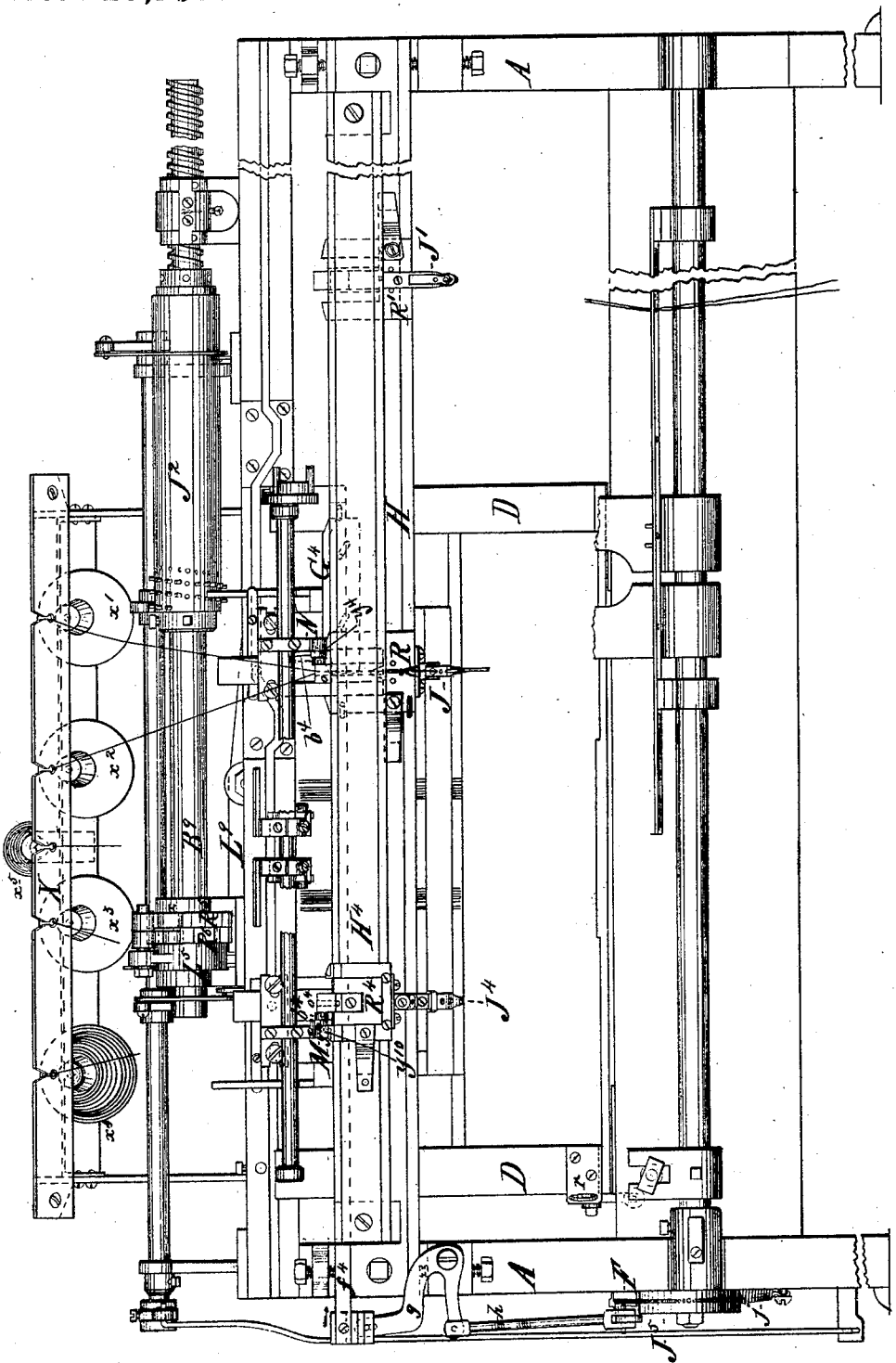

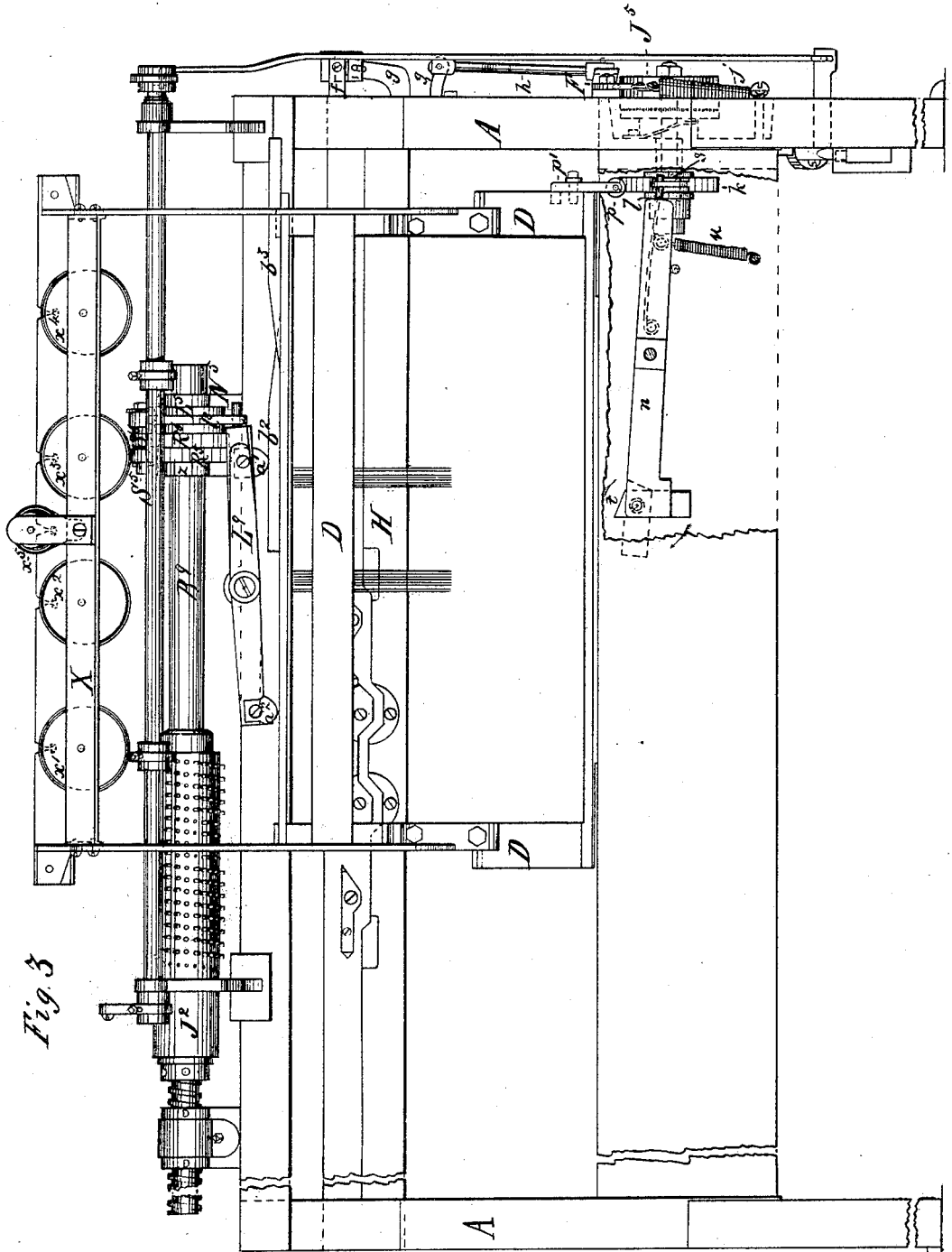

7 Sheets—Sheet 4.
A. MARCH.
Knitting-Machine.
No. 223,292. Patented Jan. 6, 1880.
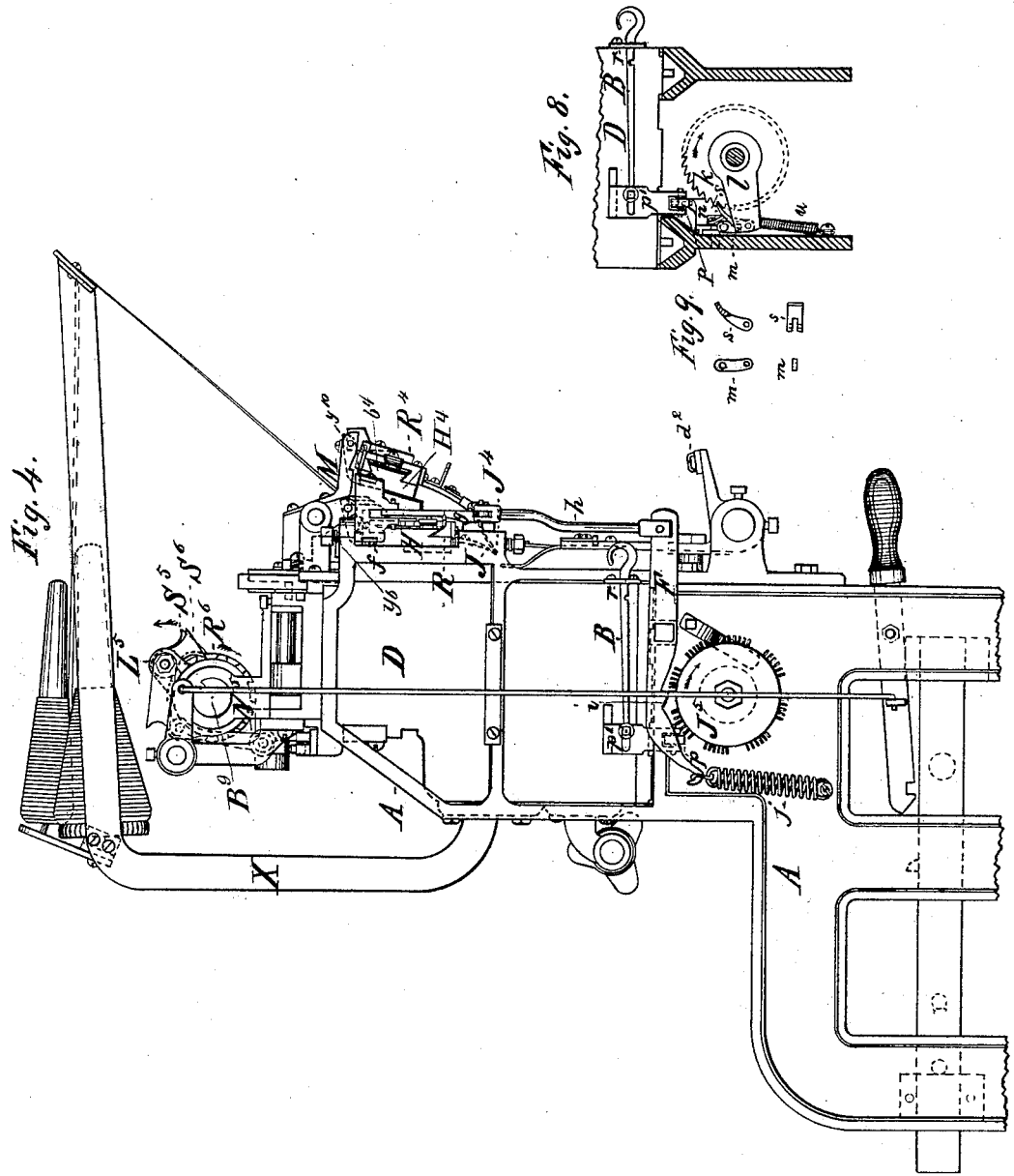

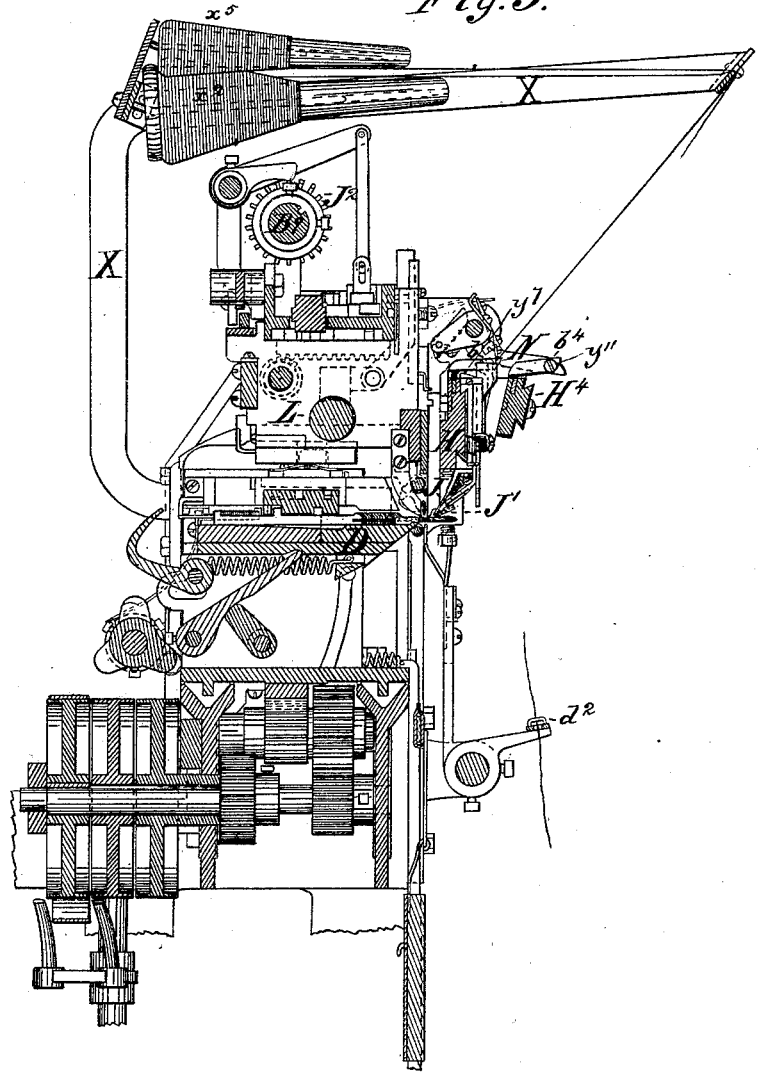

A. MARCH.
Knitting-Machine.
No. 223,292. Patented Jan. 6, 1880
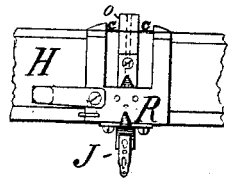
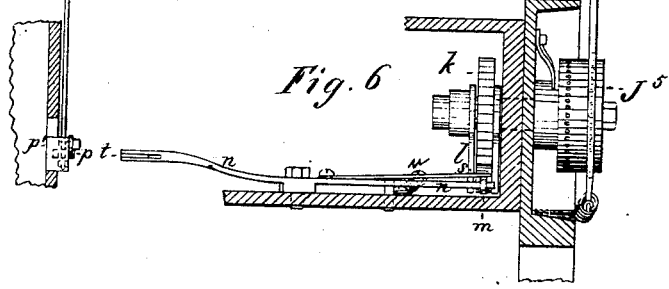
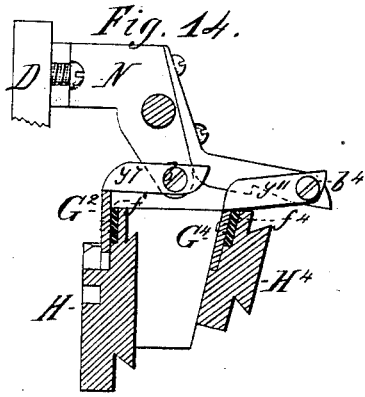

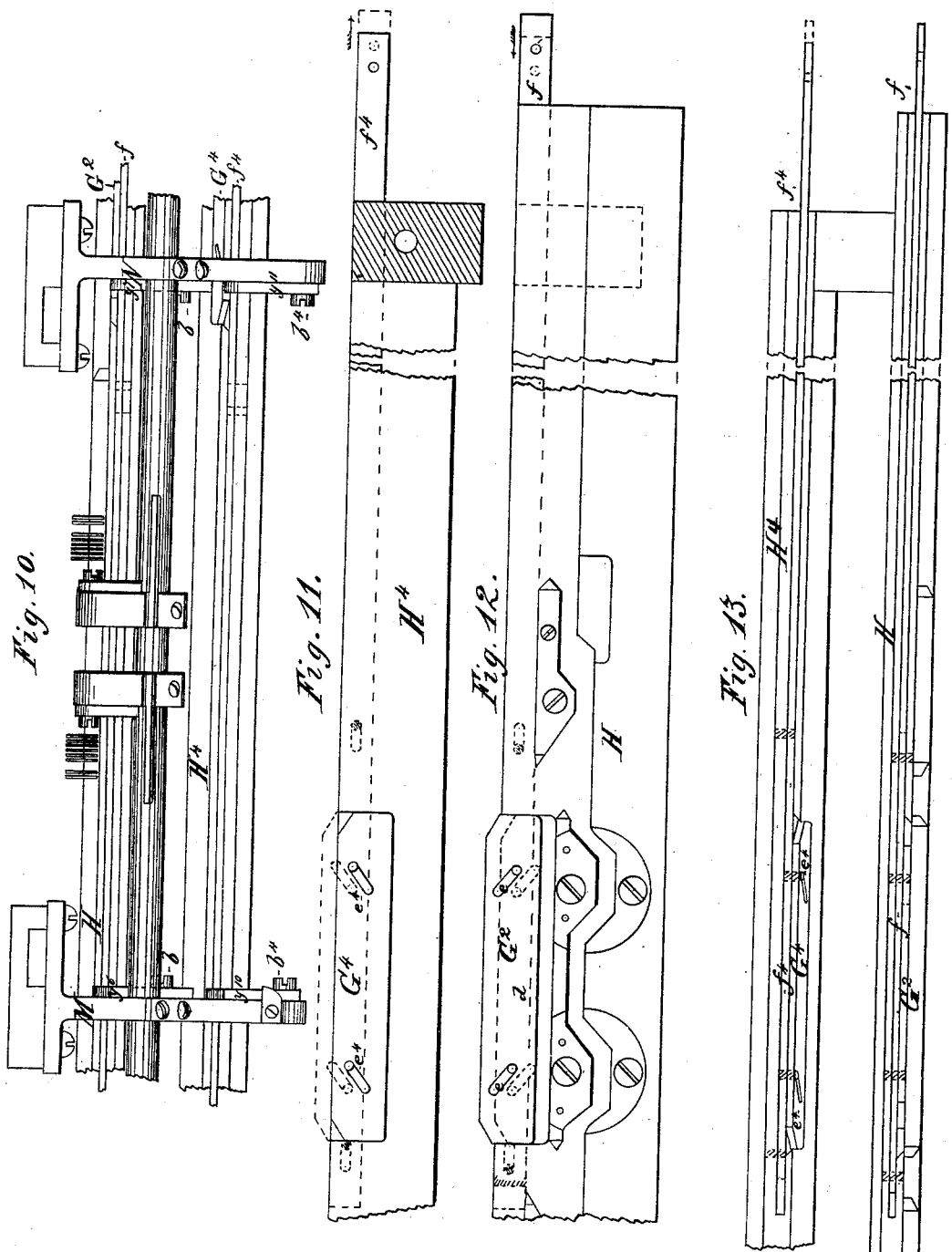

UNITED STATES PATENT OFFICE.

ALFRED MARCH, OF NEW BRUNSWICK, N. J., ASSIGNOR TO NORFOLK AND NEW BRUNSWICK HOSIERY COMPANY, OF SAME PLACE.

KNITTING-MACHINE.

SPECIFICATION forming part of Letters Patent No. 223,292, dated January 6, 1880.

Application filed July 24, 1878.

*To all whom it may concern:*

Be it known that I, ALFRED MARCH, of New Brunswick, in the county of Middlesex and State of New Jersey, have made an invention of certain new and useful Improvements in Knitting-Machines; and I do hereby declare that the following is a full, clear, and exact description and specification of the same.

The object of the invention which is set forth in this patent is to produce striped-fashioned knitted fabrics automatically—that is to say, to enable a piece of fashioned work to be knitted of yarns of different colors by knitting some of the rows of yarns of one color and some of the rows of yarns of another color, the number of rows of yarns of each color being determined (according to a preconceived design) by the operation of the machine, which also determines the fashioning of the fabric.

The striped-fashioned fabrics which can be produced by my invention are such as striped stockings, (hose and half-hose,) shirt-arms, and drawers-legs; and certain parts of my invention are applicable to fashioning knitting-machines having either a stationary needle-bed, (such, for example, as that of the Paget machine,) along which the customary thread-guide is traversed to deliver the yarn to the needle, or a movable needle-carriage, (such as that of the Kilbourn machine,) which is caused to travel past the thread-guide while the yarn is delivered to the needles. Parts of my invention, however, are applicable only to the latter class of knitting-machines—viz., the parts hereinafter specified in claims.

The invention consists of various combinations, set forth in the claims and made up out of devices of which the following are the principal: at least two thread-guides for delivering yarns of different colors to the knitting-needles of the machine, one of said thread-guides being operated to deliver yarn to the knitting-needles while the other is temporarily inactive, and vice versa; a pattern device for controlling the fashioning of the fabric, which device may be a pattern-cylinder, such as that of the Kilbourn machine, or a pattern-wheel, or a pattern-chain, such as that of the Paget machine, or a Jacquard mechanism, or such substitute for any one of these as may be deemed best by the constructor of the machine; a pattern device for controlling the striping of the fabric, which may be of any one of the kinds above mentioned; a traveling needle-carriage, such as that of the Kilbourn machine, which holds the knitting-needles and carries them crosswise of their length to and fro past the thread-guide while the latter delivers yarn to the needles.

The number of thread-guides which are required depends upon the number of colors of yarns of which the fabrics are to be knitted. Usually striped-fashioned knit fabrics are knit of yarns of two colors, and in such case two thread-guides are required, the one, which may be termed the "regular-thread guide," to deliver the yarn to the knitting-machine for knitting the ground color of the fabric, while the other thread-guide, which may be termed the "striping-thread guide," delivers yarn to the knitting-needles during the knitting of the colored stripes. According to my invention both of these thread-guides are so combined with a striping-pattern device that the latter determines which of these two shall be operative to deliver yarn to the needles, and which of the two shall temporarily stop delivering yarn, the number of rows of stitches for which each of the two thread-guides is respectively operative and inactive being determined by the said pattern device. If a fabric of more than two colors is to be knit, the number of striping-thread guides should be correspondingly increased.

My invention may be embodied in various ways, depending upon the general plan of the machine in which it is to be embodied; but as a description of the embodiment of the invention in striping-fashioning knitting-machines adapted to knit fashioned stockings striped with one color in addition to the ground-color and a verbal statement of modifications of which the machinery is susceptible will enable the invention to be understood, I have represented in the accompanying drawings, and will proceed to describe an improved Kilbourn stocking-machine embodying my invention as used to produce striped stockings of two colors. As, however, the Kilbourn stocking-machine is very complex in construction, while the rules of the Patent Office restrict the drawings of a patent to small dimensions, and as such small drawings, if representing all of the working parts of a Kilbourn stocking-machine would be excessively complex, I have represented in the accompanying drawings (for perspicuity) such parts only of the machine as are necessary to enable persons skilled in the art of constructing knitting-machines to construct a Kilbourn stocking-machine with my improvements, it being understood that the parts of the machine which are not represented in the accompanying drawings, or are not hereinafter described, may be constructed as represented and described in the patent of Edward E. Kilbourn, No. 47,829, dated May 23, 1865.

In the said drawings, Figure 1 represents a front view of the machine; Fig. 2, a top view of the same; Fig. 3, a rear view of the same; Fig. 4, an end view of the same; Fig. 5, a vertical transverse section of the same. Figs. 6 to 14, inclusive, represent detail views of parts of the machine, designated by the same letters as the same parts in the other figures, Figs. 11 and 12 being views of the inner sides of portions of the traverse-bars of the two thread-guides, Fig. 13 being a corresponding top view of the same, and Fig. 1$^a$ being a front view of the regular-thread guide and a portion of its traverse-bar.

The general arrangement of the machine so represented is the same as that of the Kilbourn stocking-machine described in said Patent No. 47,829, A denoting the frame of the machine, D the needle-carriage, J$^2$ the pattern-barrel for directing or controlling the fashioning of the fabric, and L, Fig. 5, the narrowing-screw for moving the transferring-instruments for narrowing. For the sake of perspicuity, the needle-bed, needles, and greater part of the sinkers, as well as the carriages of the transferring-instruments and the means of operating them, are omitted from some of the figures of the drawings, and for the same reason only a small portion of the pin-holes and pattern-pins of the pattern-barrel are represented in some of the figures.

The pattern-barrel J$^2$ of the machine thus represented controls the fashioning by determining when the transferring-instruments, or "ticklers," as they are commonly called by workmen, are to be operated by the driving machinery to transfer the stitches from needle to needle and fashion the fabric by either narrowing it or widening it, according to the construction of the machine. This pattern-barrel may therefore be termed the "fashioning-pattern barrel" or "fashioning-pattern device."

In the present machine the connections between the driving mechanism and the ticklers and the means through which the fashioning-pattern cylinder controls the operation of the transferring-instruments at the proper times are the same as in the Kilbourn stocking-machine before referred to, and need not be described in detail, as they are fully described in said Patent No. 47,829.

In the knitting of a single width of fashioned fabric by the Kilbourn stocking-machine but one-thread guide is used, a second or supplementary thread-guide being brought into operation upon the same traverse-bar when the two widths of fabric required to form the heel of the stocking are knit simultaneously. The first of these thread-guides is the primary or regular thread-guide of the knitting-machine, and it or some substitute for it is required according to my invention. It is denoted in the drawings by the letter J, and is carried by the thread-guide carriage R, which is constructed to traverse upon the bar H. The second, supplementary, or heel thread-guide is represented in the drawings as carried by the supplementary thread-guide carriage R', which, when in use, traverses upon the same bar H. This supplementary or heel thread-guide is not essential to my invention, as it is not required when the legs of fashioned stockings or the legs of fashioned drawers or the arms of fashioned shirts are knitted.

The striping-thread guide required by my invention is in the present example constructed like the regular-thread guide J. It is denoted by the letter J$^4$, and, as in the Kilbourn stocking-machine the regular-thread guide J is secured to a thread-guide carriage, the striping-thread guide J$^4$ is in like manner secured to a thread-guide carriage, R$^4$. In the Kilbourn machine the thread-guide remains at rest, while the needle-carriage passes by it, until the needles are all fed with yarn, after which the thread-guide is caused to travel with the needle-carriage until the latter reaches the end of its travel.

As the invention is represented in the present example as applied to a Kilbourn machine, the regular-thread guide-carriage R, which is fitted to traverse upon the bar H, is traversed at the proper times for knitting by means of the two bumpers M N, secured to the needle-carriage.

In order that the bumpers may act upon the thread-guide carriage, it is fitted with a central snug, o, within the range of traverse of the screw-heads b b of the bumpers, so that one bumper-screw will strike the said snug and cause the thread-guide carriage to travel with the needle-carriage when moving to the right after a row of yarn has been fed to the needles, and the other bumper-screw will strike the said snug and cause the thread-guide carriage to travel with the needle-carriage when moving to the left after a row of yarn has been fed to the needles.

In order to return the regular-thread guide to the position which it is to occupy during the delivery of yarn, each bumper is fitted with a latch, $y^6$ and $y^7$, which is arranged to engage in a recess in the top of the thread-guide carriage at one side of the central snug, the two recesses for the two latches being denoted by the letters $c\ c$, and being separated from the adjacent end of the carriage by an inclined protuberance, up which the end of the latch can move as it passes to its recess. The latch which is carrying the thread-guide along at any one time is disengaged when the thread-guide reaches its position for delivering yarn by means of a cam-grade, $G^2$, whose ends are inclines, up which the end of the latch is shoved as it is moved with its bumper, so as to disengage the latch end from the recess and leave the thread-guide carriage and thread-guide at rest during the delivery of yarn to the traveling series of needles.

The striping-thread guide $J^4$ is constructed like the regular-thread guide, and its carriage $R^4$ is fitted to traverse upon an additional traverse-bar, $H^4$, which is supported at its ends by brackets connecting it with the frame of the machine.

The two thread-guides, being fitted to carriages which traverse upon separate traverse-bars, are thus independent of each other, and either can be used to deliver yarn without being affected by the other.

Special means may be used to move the carriage of the striping-thread guide; but for simplicity the same two bumpers or arms M N which impart motion to the carriage R of the regular-thread guide are employed to impart motion to the striping-thread guide, the front ends of these bumpers being for this purpose extended outward from the needle-carriage, and being fitted with additional bumper screw-heads $b^4\ b^4$, which engage, during knitting, with the central snug, $o^4$, of the striping-thread guide-carriage $R^4$, and with additional latches $y^{10}\ y^{11}$, which engage in recesses $c^4\ c^4$ in the top of the striping-thread guide-carriage.

When the striping-thread guide is operative for knitting its carriage is operated precisely as the regular-thread guide-carriage is operated when the latter thread-guide is operative for knitting, a central cam-grade, $G^4$, being provided to detach its latches as required.

According to my invention the regular-thread guide and the striping-thread guide operate to feed yarn alternately, and while the one is operative the other is temporarily inactive.

In order that a thread-guide may deliver yarn to a series of knitting-needles, there must be a relative movement of the thread-guide and series of needles. Thus either the thread-guide must remain stationary while the needles are caused to traverse by it, or the thread-guide must traverse along the series of needles while the latter remain at rest; or, if both move while the yarn is to be fed, there must be a difference between the movement of the series of needles and the movement of the thread-guide. The first of these variations of movement is employed in the Kilbourn machine. Consequently, as the machine represented in the drawings operates on that plan, it follows that if the thread-guide be caused to traverse continually with the needles the thread-guide and needles will not move relatively to each other, and the thread-guide will be inactive to feed yarn so long as this simultaneous traversing takes place. Hence, when my invention is applied to a Kilbourn machine, the thread-guide which is to be inactive is connected with the needle-carriage, so as to traverse continually with it throughout its whole stroke, while the other thread-guide, which is to be operative to feed yarn, is disconnected from the needle-carriage whenever yarn is to pass from it to the needles, the thread-guide so disconnected remaining at rest while the needles pass by it until the yarn to make the row of stitches is fed out.

The continual connection of either thread-guide carriage with the needle-carriage is effected by permitting one or other of the latches of the bumpers to remain engaged in its appropriate recess in the top of the thread-guide carriage, and the disconnection of either thread-guide carriage from the needle-carriage is effected by raising the engaged latch out of such recess at the time the thread-guide is to remain at rest.

According to my invention, also, the rows of knitting during which each thread-guide is to operate to feed yarn are determined by a striping-pattern device which controls the operations of the thread-guides, and the kind of pattern device which is represented in the accompanying drawings for this purpose is a pattern-wheel, $J^5$, having its periphery pierced with a series of pin-holes, one for each row of stitches to be knitted until the pattern of striping is to be repeated.

In the present example the pattern-wheel $J^5$ contains sixty-four pin-holes, each of which is suitable to be fitted with a pattern-pin; and the combining mechanism with the thread-guides is so arranged that the pattern-pins correspond with the rows of stitches during which the regular-thread guide J feeds yarn, while the pattern-holes which are not fitted with pins correspond with the rows of striping or the rows of stitches during which the striping-thread guide $J^4$ feeds yarn. This pattern-wheel determines the operations of the regular-thread guide and the striping-thread guide, in the present example, through the following combining mechanism:

The central cam-grade, $G^2$, of the traverse-bar H of the regular-thread guide J, instead of being fixed to the traverse-bar, is made movable by being formed upon the upper edge of the plate $d$, Fig. 12, which may be raised or lowered in a recess of the traverse-bar, and which, when raised, projects within the range of traverse movement of the bumper-latches $y^6\ y^7$. When this cam-grade is raised its height above the traverse-bar is sufficient to hold the latches out of engagement with the recesses of the thread-guide carriage. When this cam-grade $G^2$ is lowered the bumper-latch which happens to be engaged with the thread-guide carriage R remains continually connected with it, so that the regular-thread guide then traverses continually with the needle-carriage and is temporarily inactive to feed yarn.

The plate $d$ of this cam-grade $G^2$ is fitted with inclined slots $e\ e$, Fig. 12, which receive the pins of a slide-bar, $f$. The slide-bar slides in a groove in the traverse-bar H, and is connected at its outer end by means of an elbow-lever, $g$, and rod $h$ with a lever, F, one of whose arms $i$ is arranged over the row of pattern-pins of the pattern-wheel $J^5$, so as to be moved thereby. The movement of the lever F by the pattern-pins draws the slide-bar $f$ longitudinally and causes its pins to raise the cam-grade $G^2$, and when the pattern-pins pass from beneath the end of the lever F the latter is moved downward by a spring, $j$, the slide-bar $f$ is pushed inward, and its pins, moving in the inclined slots $e\ e$, are caused to depress the cam-grade $G^2$.

The control of the striping-thread guide $J^4$ by the striping-pattern device $J^5$ is effected in the same manner, the central cam-grade, $G^4$, of the traverse-bar $H^4$ of this thread-guide being a movable cam, so that it may be raised or lowered by the action of the slide-bar $f^4$, whose pins act in inclined slots $e^4\ e^4$, Fig. 11, of the plate of the cam-grade $G^4$. This slide-bar $f^4$ is connected with the same elbow-lever $g$, rod $h$, and lever F as the slide-bar for the regular-thread guide J, so that both slide-bars are moved simultaneously; but the direction of inclination of the slots $e^4\ e^4$ of the cam-grade $G^4$ for the striping-thread guide is the reverse of that of the slots $e\ e$ of the regular-thread guide. Consequently, when the cam grade of one thread-guide is raised the other is depressed, and vice versa, and, therefore, when one thread-guide is permitted to operate to feed thread the other is rendered inactive, and vice versa.

The positions of the pattern-pins and holes unoccupied by pattern-pins control the action of each thread-guide, as before described. Consequently it is necessary only to adjust or construct the pattern device in order that the fabric shall be striped as desired, and to cause the pattern device to move under the lever F progressively with the knitting. With the Kilbourn stocking-machine it is most convenient to move the pattern device once for each two rows of yarn knit into stitches or loops; and consequently, as the striping-pattern wheel $J^5$ has, in this case, one pin-hole for each row of stitches, it is necessary to turn this pattern-wheel the space of two pins or pin-holes at a time. It is also expedient to move the pattern-wheel, shortly after the commencement of each movement of the needle-carriage, in the direction away from the end of the machine at which the pattern-wheel is in this case located.

The progressive movement of the striping-pattern device may be derived, through suitable transmitting devices, from any suitable part of the machine that is in motion at the proper time. In the present example it has been found convenient to derive the movement from the needle-carriage. To this end the shaft of the pattern-wheel $J^5$ is fitted, inside the frame of the machine, with a ratchet-wheel, $k$, having half as many teeth as the number of pin-holes in the pattern-wheel. This ratchet-wheel is operated by a pawl, $s$, which is connected with an arm, $l$, swinging upon the pattern-wheel shaft as an arbor.

The pawl is moved by the needle-carriage through the intervention of the link $m$, the lever $n$, and the friction-wheel $p$, the last of which is connected with the needle-carriage D, and is moved to and fro with it. The lever is fitted at its inner end with an incline, $t$, upon which the friction-wheel $p$ operates when the needle-carriage is moving away from that end of the frame. The depression of the incline $t$ at one end of the lever raises the pawl $s$ at the other end of the lever and pushes round the pattern-wheel the space of two pin-holes. As soon as the wheel $p$ passes over the incline of the lever the latter is moved to draw the pawl $s$ backward over the ratch-teeth, ready for a new movement, by means of a spring, $u$. This second movement of the lever raises the incline $t$ within the range of the friction-wheel on its return movement with the needle-carriage: and to prevent the friction-wheel from then operating the lever or striking the incline with force, the incline is connected with the lever by a pivot, (see Fig. $3^a$,) which permits it to turn and let the friction-wheel pass over it when the wheel is moved toward the adjacent end of the main frame.

The shank of the incline below the pivot is made heavy enough to restore the position of the incline as soon as the friction-wheel leaves it, so that the incline is in proper position to be operated by the friction-wheel in its movement from the adjacent end of the frame.

The fashioning-pattern barrel $J^2$, which controls the fashioning of the fabric, may be operated at the proper time by any suitable moving part of the machine. Thus it might be moved, as represented in the drawings of the said Kilbourn Patent, No. 47,829, by a movement derived indirectly from the needle-carriage through the slide-bar that shifts the belt for reversing the movement of the needle-carriage; but in the present machine it has been found more convenient to derive the movement of the pattern device for fashioning more directly from the movement of the needle-carriage; and to this end the shaft $B^9$ of the fashioning-pattern barrel is formed with a longitudinal groove, as in the said Kilbourn machine, and passes through a sleeve, $z$, which turns in the standard $N^5$, and is fitted with a feather that engages in the said groove, so that when the sleeve is turned the shaft and pattern-barrel are turned with it, whatever be the longitudinal or endwise position of the pattern-barrel.

The sleeve is fitted with two ratchet-wheels,

R⁵ R⁶, each having half as many teeth as there are longitudinal rows of pin-holes in the pattern-barrel J², the teeth of the two wheels being alternated so that a tooth of one wheel corresponds with the space between the teeth of the other, so that there is a tooth of one or other ratchet-wheel for every longitudinal row of pin-holes in the pattern-barrel. The ratchet-teeth of these two wheels are acted upon alternately by pawls S⁵ S⁶, that are pivoted to and vibrate with an elbow-lever or two-armed hub, L⁵, which is fitted to vibrate on the sleeve as an arbor. The rear arm of this lever is connected by a link, l⁸, with a lever, L⁹, which is pivoted at its center to the frame of the machine, and is fitted at its opposite ends with tappets a' a². These tappets are situated above two inclines, b² b³, which are secured side by side to the needle-carriage, so that when the needle-carriage moves in one direction one of these inclines, b², acting upon one tappet, a', rocks the lever L⁹ and moves the pawls S⁵ S⁶ of the ratchet-wheels and the pattern-barrel in one direction, and when the needle-carriage moves in the opposite direction the other incline, b³, acting upon the other tappet, a², rocks the lever and moves the pawls S⁵ S⁶ of the ratchet-wheels in the opposite direction. The pawls S⁵ S⁶ are reversible upon the pivot that connects them with the vibrating lever L⁵, so that they may be set by the attendant to move the pattern-barrel in either direction at pleasure.

The fashioning-pattern barrel or device J² of the fashioning mechanism of the machine, and the striping-pattern wheel or device J⁵ of the striping mechanism are thus combined with each other in the present example through the intervention of the needle-carriage, so that the two pattern devices are caused to operate in concert, the first controlling the fashioning and the second the striping of the fabric.

It is not, however, essential to my invention that the two pattern devices should be combined through the intervention of the needle-carriage, as they may be combined so as to operate in concert by other means. Thus, if deemed expedient, the striping-pattern device may be a pattern-barrel with a helical line of pin-holes of the same pitch as the helical line of the pin-holes of the fashioning-pattern barrel J², and such striping-pattern barrel may be fitted to an extension of the shaft B⁹ of the fashioning-pattern barrel, the lever F, which is operated by the pattern-pins, and the connecting mechanism through which the striping-pattern device controls the action of the thread-guides, being in such case arranged and constructed to correspond with the different locations of the striping-pattern device.

If the machine to which the invention is applied be one on the Paget plan, in which the fashioning-pattern device is a pattern-chain turned by a chain-wheel by motion derived from the driving-shaft, the striping-pattern device may be a corresponding pattern-chain with either pins or protuberances to operate upon a lever, which is combined with the regular and striping thread guides; and this striping-pattern chain may be moved by a chain-wheel connected with the fashioning chain-wheel, or may be moved by a motion derived separately from the driving-shaft of the machine. In this last case the two pattern devices will be combined through the intervention of the driving-shaft from which both derive their movement, so as to operate in concert (though not necessarily at the same instant) and produce a fabric which is both fashioned and striped.

When both pattern devices derive their motion from the driving-shaft, such shaft becomes the substitute of the needle-carriage of the machine represented in the accompanying drawings for the purpose of combining the two pattern devices.

In case a pattern-barrel with a helical row of pin-holes, or a pattern-chain similar to that of the Paget machine, is used to control the striping, the striping may, if desired, be varied throughout the entire length of the piece of fabric to be fashioned, and a pattern-chain for the same purpose may be readily applied to the machine represented in the drawings by substituting for the pattern-wheel J⁵ a chain-wheel carrying the pattern-chain so as to turn it one link at a time.

In the machine represented in the drawings it has been found convenient to mount some of the yarn-bobbins upon the needle-carriage. To this end this carriage is provided with a raised frame, X, having horizontal spindles, to which the yarn-bobbins $x' \ x^2 \ x^3 \ x^4 \ x^5$ can be applied by the attendant. As stockings are frequently knit with two yarns simultaneously, two of these bobbins, $x' \ x^2$, are used to supply the yarn for regular knitting, or the knitting of the ground color; two, $x^3 \ x^4$, are used for the striping-yarn, and another, $x^5$, is used to supply a slack-twisted doubled yarn for one of the heel-stripes.

One or more additional bobbins may be set upon the floor of the factory to supply other yarns—as, for example, a bobbin to supply yarn to the supplemental-thread guide J', which delivers yarn for the other heel-stripe. In this case the yarn is guided for this supplemental thread-guide by the guide-eye d².

When my invention is applied to a machine such as the Paget machine, in which the regular thread-guide traverses along the series of needles while delivering the yarn to them, the striping-thread guide is arranged to traverse upon an additional traverse-bar, parallel with the traverse-bar of the regular-thread guide, and the striping-thread guide and regular-thread guide are alternately engaged with and disengaged from the driver that moves the regular-thread guide, according as the fabric is to be knitted of yarn of one color or yarn of another color.

If the fabric is to be knitted of yarns of three different colors in alternate succession, two striping-thread guides (in addition to the regular-thread guide) are required in place of one, in which case each should be mounted upon its appropriate traverse-bar; or two striping-thread guide-carriages may be mounted back to back upon the same traverse-bar, provided each be fitted to traverse upon separate ways without interfering with the other. In this case the connection between the striping-pattern device and the central cam-grades, (or other devices,) which throw the several thread-guides into operation or out of operation, will be more complicated than in the machine represented, as two of the three thread-guides should be thrown out of operation, while the third is operative, and the striping-pattern mechanism should be varied accordingly.

In place of fitting the striping-thread guide to traverse on a bar, the thread-guide may be secured to the bar, and the whole bar may be fitted to traverse in suitable bearings, and, if the machine operates upon the Kilbourn plan, this bar would then be connected with and disconnected from the needle-carriage, according to the action of the striping-pattern device as required to produce the striping.

In place of raising and depressing the central cam-grades of the traverse-bars by causing them to slide up and down, each may be made to rock upon a horizontal axis, and may be rocked up or down by the action of the striping-pattern device.

The combining mechanism between the two pattern devices of the machine and the transferring-instruments and thread-guides, whose actions they control, may also be greatly varied without changing substantially the movements of the said instruments and guides.

The several variations of mechanism above described are sufficient to show that my invention is not restricted to the precise means by which it is embodied, as represented in the accompanying drawings, but that the means of embodying it in a knitting-machine may be greatly varied according to the general plan of the machine or the views of constructors.

In the machine represented in the drawings the pattern-wheel $J^5$ is provided with two sets of pin-holes and the wheel is reversible on its arbor, so that pattern-pins for striping in two patterns may be set in the wheel, and either may be used, as described, by setting the wheel on its arbor so as to make the appropriate pattern-pins move beneath the lever F.

Sometimes it is convenient to be able to use a striping-fashioning machine to knit fashioned fabrics without striping—as, for example, to knit the heel-stripes of stockings. In order that the machine represented in the drawings may be used in that way, provision is made for throwing the whole striping mechanism out of operation. To this end the friction-wheel $p$, which operates the striping-pattern device, is connected with the needle-carriage by a slide, $p'$, which may be moved laterally of its line of travel by means of a shipper, B, so that it is out of the range of the incline of the lever $n$, in which condition no movement is imparted to the striping-pattern wheel $J^5$, and the whole striping mechanism is rendered temporarily inoperative. The wheel $p$ can be held either in or out of the position for operating the lever $n$ by the engagement of one or other of two notches of the shipper B upon the edge of the plate $r$.

I claim as my invention in knitting-machines—

1. The combination, substantially as before set forth, of two independent thread-guides, two cam-grades for rendering said guides operative, and the striping-pattern device for determining which of said cam-grades shall render its corresponding thread-guide operative or inactive for the delivery of yarn to the knitting-needles.

2. The combination, substantially as before set forth, of a needle-carriage constructed to travel with the needles crosswise of their length, two independent thread-guides, two thread-guide carriages fitted to traverse independently on traverse-bars, the bumpers for imparting the traversing movement to said thread-guides, and the latches for connecting said thread-guides with the bumpers.

3. The combination, substantially as before set forth, of the fashioning-pattern device, the striping-pattern device, and the thread-guides, which are controlled by the latter through suitable combining mechanism.

4. The combination, substantially as before set forth, of two independent thread-guides, the striping-pattern device, and the traveling needle-carriage constructed to travel with the needles crosswise of their length.

Witness my hand this 25th day of June, A. D. 1878.

ALFRED MARCH.

Witnesses:
E. S. RENWICK,
W. L. BENNEM.